(12) United States Patent
Oh et al.

(10) Patent No.: US 8,962,107 B2
(45) Date of Patent: Feb. 24, 2015

(54) LIQUID CRYSTAL DISPLAY DEVICE, METHOD OF MANUFACTURING THE SAME AND ALIGNMENT LAYER COMPOSITION FOR THE LIQUID CRYSTAL DISPLAY DEVICE

(75) Inventors: Keun-Chan Oh, Cheonan-si (KR); Jae-Jin Lyu, Yongin-si (KR); Ji-Won Sohn, Seoul (KR); Seon-Ah Cho, Busan (KR)

(73) Assignee: Samsung Display Co., Ltd. (KR)

( * ) Notice: Subject to any disclaimer, the term of this patent is extended or adjusted under 35 U.S.C. 154(b) by 508 days.

(21) Appl. No.: 12/684,043

(22) Filed: Jan. 7, 2010

(65) Prior Publication Data

US 2010/0182556 A1 Jul. 22, 2010

(30) Foreign Application Priority Data

Jan. 19, 2009 (KR) .................. 10-2009-0004174

(51) Int. Cl.
G02F 1/1337 (2006.01)
C09K 19/56 (2006.01)

(52) U.S. Cl.
CPC .......... *C09K 19/56* (2013.01); *G02F 1/133707* (2013.01); *G02F 1/133723* (2013.01); *G02F 1/133788* (2013.01); *G02F 2001/133726* (2013.01)
USPC ............. 428/1.26; 428/1.2; 428/1.1; 349/123

(58) Field of Classification Search
CPC ........ C09K 19/00; C09K 19/08; C09K 19/10; C09K 19/12; C09K 19/14; C09K 19/56
USPC ............. 428/1.1, 1.2, 1.26; 349/43, 117, 123, 349/124, 127
See application file for complete search history.

(56) References Cited

U.S. PATENT DOCUMENTS

| | | | | |
|---|---|---|---|---|
| 5,830,976 A | * | 11/1998 | Sugimori et al. | 528/172 |
| 6,201,588 B1 | * | 3/2001 | Walton et al. | 349/123 |
| 6,491,988 B1 | * | 12/2002 | Gibbons et al. | 427/553 |
| 7,081,935 B2 | * | 7/2006 | Chida et al. | 349/135 |
| 7,408,020 B2 | * | 8/2008 | Oh et al. | 528/424 |

(Continued)

FOREIGN PATENT DOCUMENTS

| | | |
|---|---|---|
| JP | 2004-163866 | 6/2004 |
| JP | 2004-524393 | 8/2004 |

(Continued)

OTHER PUBLICATIONS

Heiko Thiem, Peter Strohriegal, Maxim Shkunov, Iain McCulloch Photopolymerization of Reactive Mesogens, Sep. 2, 2005 Macromolecular Chemistry and Physics, 2005, 206, 2153-2159.*

*Primary Examiner* — Erik Kashnikow
*Assistant Examiner* — Eli D Strah
(74) *Attorney, Agent, or Firm* — Innovation Counsel LLP

(57) ABSTRACT

A liquid crystal display device that includes an array substrate, an opposite substrate and a liquid crystal display layer is described. The array substrate includes a pixel electrode and a lower alignment layer. The pixel electrode has a plurality of slit portions extending in different directions. The lower alignment layer includes a reactive mesogen (RM) diamine is formed on the pixel electrode to induce an alignment direction of the liquid crystal molecules. An upper alignment layer is formed on a common electrode of the opposite substrate. The RM is cured at surfaces of the lower and upper alignment layers in response to ultraviolet (UV) light, so that liquid crystal molecules have a pretilt angle. Therefore, the aperture ratio and the response time may be improved, and afterimages may be decreased, so that display quality may be improved.

11 Claims, 9 Drawing Sheets

(56) References Cited

U.S. PATENT DOCUMENTS

| | | | |
|---|---|---|---|
| 2004/0138408 A1* | 7/2004 | Harris et al. | 528/354 |
| 2005/0036089 A1* | 2/2005 | Lyu | 349/117 |
| 2006/0051524 A1* | 3/2006 | Gibbons et al. | 428/1.2 |
| 2008/0024705 A1* | 1/2008 | Hasegawa et al. | 349/123 |
| 2009/0002588 A1* | 1/2009 | Lee et al. | 349/42 |
| 2010/0085523 A1* | 4/2010 | Terashita et al. | 349/123 |

FOREIGN PATENT DOCUMENTS

| | | | |
|---|---|---|---|
| JP | 2004-286984 | 10/2004 | |
| JP | WO 2008/117615 A1 * | 2/2008 | ............ G02F 1/1337 |
| KR | 10-2001-0081454 A | 8/2001 | |
| KR | 10-2006-0078789 A | 7/2006 | |
| KR | 10-2008-0007149 A | 1/2008 | |
| KR | 10-2008-0114353 A | 12/2008 | |

* cited by examiner

FIG. 1
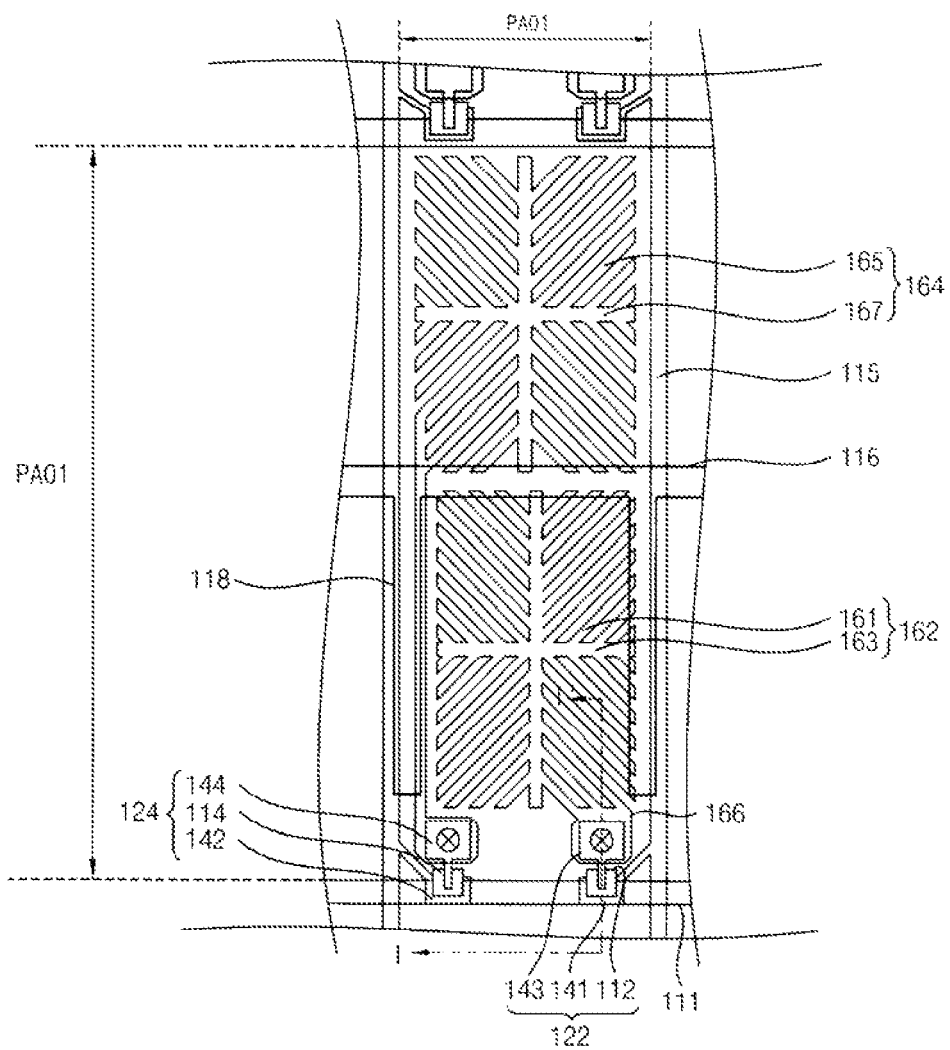
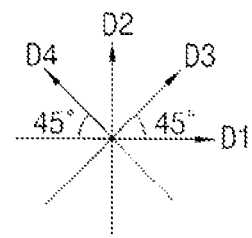

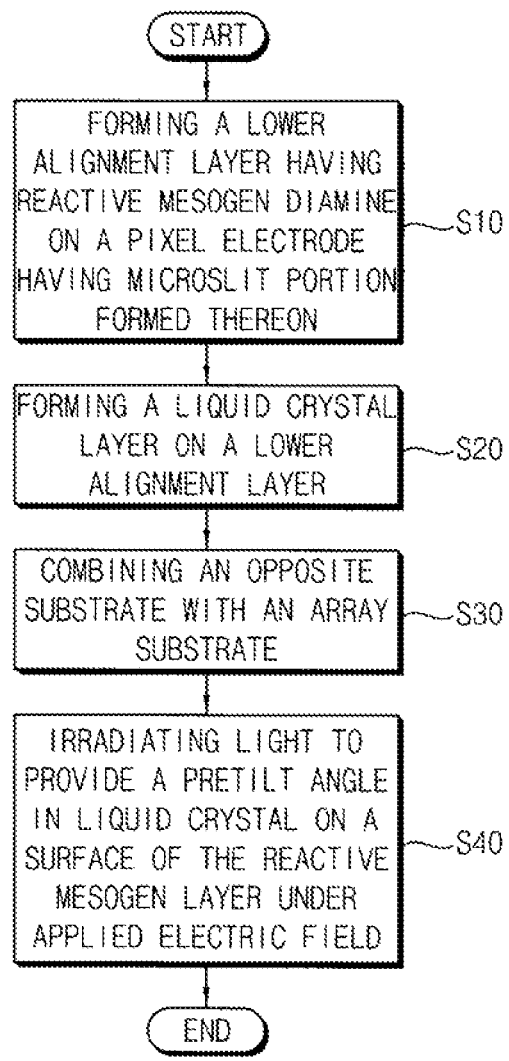
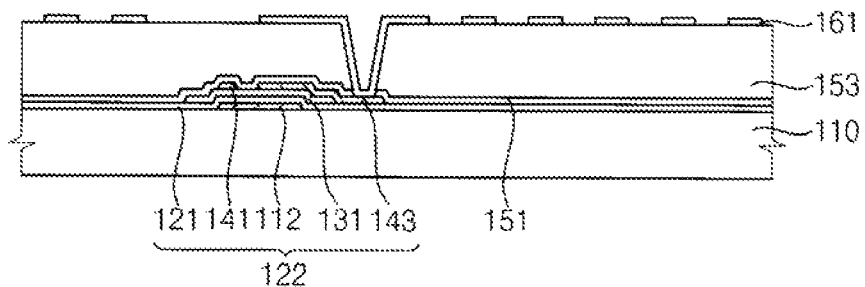

FIG. 5
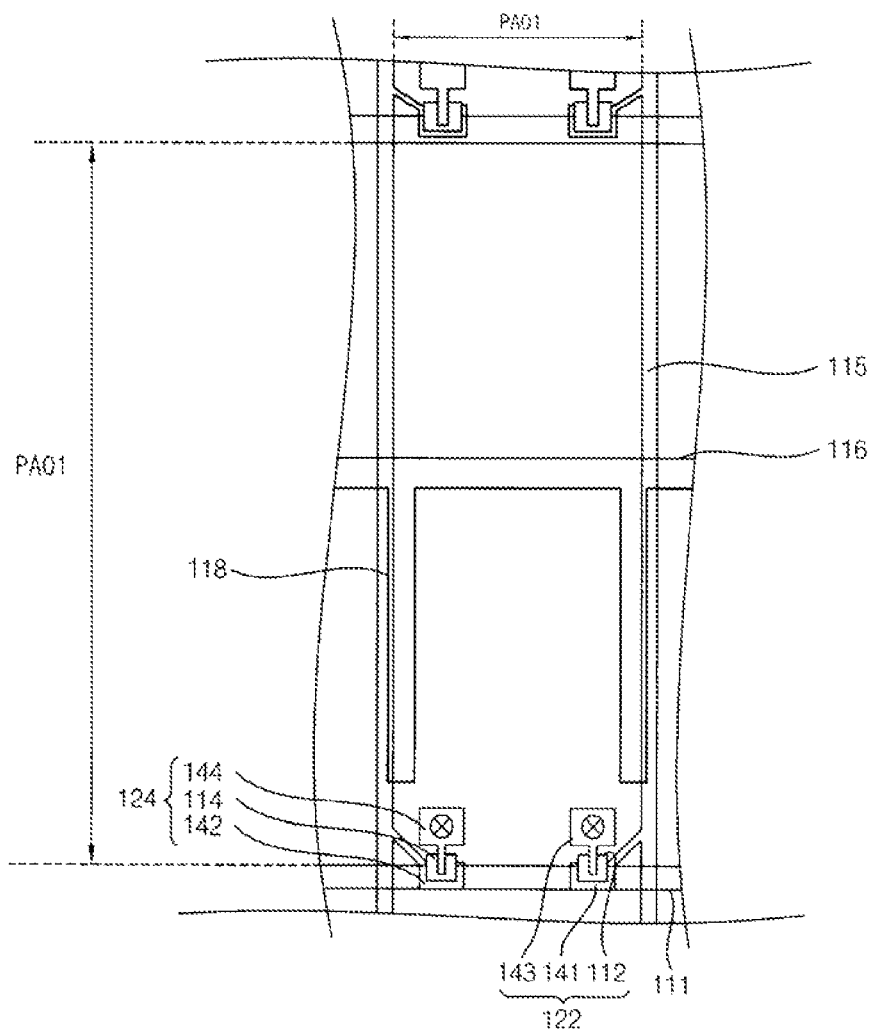
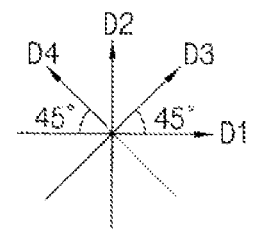

LIQUID CRYSTAL DISPLAY DEVICE, METHOD OF MANUFACTURING THE SAME AND ALIGNMENT LAYER COMPOSITION FOR THE LIQUID CRYSTAL DISPLAY DEVICE

CROSS REFERENCE TO RELATED APPLICATION

This application claims priority under 35 U.S.C. §119 to Korean Patent Application No. 10-2009-0004174, filed on Jan. 19, 2009 in the Korean Intellectual Property Office (KIPO), the contents of which are herein incorporated by reference in their entirety.

BACKGROUND OF THE INVENTION

1. Field of the Invention

The present invention relates to a liquid crystal display (LCD) device, a method of manufacturing the LCD device and an alignment layer composition used for the LCD device. More particularly, the present invention relates to an LCD device capable of enhancing display quality by improving the viewing angle and the response time, a method of manufacturing the LCD device and an alignment layer composition used for the LCD device.

2. Description of the Related Art

Generally, in a liquid crystal display (LCD) device, a voltage is applied to an electric field generating electrode to provide the liquid crystal layer with an electric field. The arrangement of liquid crystal molecules of the liquid crystal layer is controlled in response to the electric field, thereby displaying images.

In order to obtain a high contrast ratio and a wide viewing angle, a patterned vertical alignment (PVA) mode LCD device has been developed. In the PVA mode LCD device, an opening portion (hereinafter, a slit portion) having a slit shape is formed through the electric field generating electrode, and liquid crystal molecules are vertically aligned to form multiple domains.

For a small to medium-size mobile LCD device, in order to decrease the slit portion which decreases an aperture ratio, a microslit mode LCD device or a super patterned vertical alignment (S-PVA) mode LCD device has been developed. In the microslit mode LCD device, the microslit portion is only formed through a lower electrode of the electric field generating electrodes to provide directionality to the liquid crystal molecules. The upper electrode is formed from a continuous layer in which an opening portion is not formed.

In a vertical alignment (VA) mode such as the PVA mode and the microslit mode, a rubbing process is not performed directly on an alignment layer; however, a light alignment method, which includes aligning liquid crystal molecules by inducing anisotropy in an alignment layer through light irradiation, may be employed.

To align the liquid crystal molecules, a photocrosslinkable copolymer including a mesogenic group, called a reactive mesogen (RM), having liquid crystal properties, is irradiated by polarized ultraviolet (UV) light to induce anisotropy, and heat processing is performed on the photocrosslinkable copolymer to enhance the anisotropy of the alignment layer.

However, the RM may not be easily cured at a surface of the alignment layer, and the RM may remain in the liquid crystal layer. The RM remaining in the liquid crystal layer may be cured by light from a backlight of the LCD device. Cured amounts of the RM are different from each other depending on their location so that the pretilt angles of the liquid crystal molecules may not be uniform. As a result, afterimages may be seen on a display screen.

Using high-intensity UV light to completely remove an RM from the liquid crystal molecules may cause organic material decomposition and reliability deterioration.

SUMMARY OF THE INVENTION

Embodiments of the present invention provide a liquid crystal display (LCD) device having improved display quality through an improved viewing angle and an improved response time.

Embodiments of the present invention provide a method of manufacturing the above-mentioned LCD device.

Embodiments of the present invention provide an alignment layer composition used for the above-mentioned LCD device.

According to one aspect of the present invention, an LCD device includes an array substrate, an opposite substrate and a liquid crystal display layer. The array substrate includes a lower substrate, a pixel electrode and a lower alignment layer. The lower substrate has a switching part formed thereon. The pixel electrode is formed on a unit pixel area defined on the lower substrate to connect with the switching part. The pixel electrode has a plurality of slit portions extending in different directions. The lower alignment layer formed on the pixel electrode includes a reactive mesogen (RM) to induce an alignment direction of the liquid crystal molecules. The opposite substrate includes an upper substrate located opposite the lower substrate. A common electrode is formed on the upper substrate opposite to the pixel electrode, and an upper alignment layer is formed on the common electrode. The upper alignment layer has an RM to induce an alignment direction of the liquid crystal molecules. The liquid crystal layer includes liquid crystal molecules formed to have a pretilt angle between a surface of the lower alignment layer and a surface of the upper alignment layer.

The upper alignment layer and the lower alignment layer include a polyimide, and are formed from an alignment layer composition including a base dianhydride, a base diamine, a crosslinker, a vertical alignment diamine and an RM diamine. The content of the RM diamine is about 10 wt % to about 80 wt % based on a total weight of the base diamine, the vertical alignment diamine and the RM diamine.

The pixel electrode includes a first pixel electrode and a second pixel electrode that are disposed on the unit pixel area to receive different pixel voltages, slit portions that are formed on a plurality of domains defined on the first and second pixels, and a common electrode corresponding to the first and second pixel electrodes that has a continuous shape and that does not include an opening.

In one embodiment of the present invention, the lower alignment layer and the upper alignment layer are configured to vertically arrange a long axis of the liquid crystal molecules when an electric field is not applied to the liquid crystal layer, or they are configured to arrange a long axis of the liquid crystal molecules in an extending direction of the slit portion at each of the domains when an electric field is applied to the liquid crystal layer.

The alignment layer composition further includes an initiator having substantially the same structure as the RM diamine. The liquid crystal layer further includes an additional RM, which is no more than about 0.3 wt %.

The RM diamine may include a compound represented by the following chemical formula, wherein Y represents at least one selected from the group consisting of an acrylate group, a methacrylate group, a vinyl group, a vinyloxy group and/or an epoxy group; $X_2$ represents an alkyl group, an alkenyl group, and/or an alkynyl group having 1 to 18 carbon atoms and having a chain or ring structure including at least one ring or condensed ring; $A_2$ represents an alkenyl group, and/or alkynyl group having 1 to 18 carbon atoms and having a chain or ring structure including at least one ring or condensed ring, wherein each hydrogen atom is replaceable with a functional group; $X_1$ represents an alkyl group, an alkenyl group, and/or an alkynyl group, which have 1 to 18 carbon atoms and have a chain or ring structure including at least one ring or condensed ring, —COO—, —OCO—, —O— or —CONH—; and $A_1$ represents an alkenyl group, an alkenyl group, and/or an alkynyl group having 1 to 18 carbon atoms and having a chain or ring structure including at least one ring or condensed ring, wherein each hydrogen atom is replaceable with a functional group.

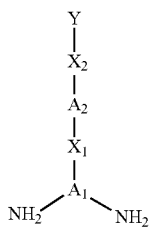

According to another aspect of the present invention, there is provided a method of manufacturing an LCD device. In the method, a lower alignment layer is formed on an array substrate and includes a pixel electrode having a plurality of slit portions inducing an alignment direction of the liquid crystal molecules. The lower alignment layer includes an RM. An opposite substrate is coupled to the array substrate. A liquid crystal layer is provided between the lower alignment layer and the opposite substrate. The lower alignment layer is irradiated by light under conditions in which an electric field is applied to the liquid crystal layer through the pixel electrode to provide a pretilt angle to the liquid crystal molecules at the surface of the lower alignment layer.

An upper alignment layer is formed on a common electrode of the opposite substrate before coupling the opposite substrate to the array substrate, the upper alignment layer including an RM.

The common electrode corresponding to the pixel electrode has a continuous shape and does not include an opening. The content of the RM diamine is about 10 wt % to about 80 wt % based on a total weight of the base diamine, the vertical alignment diamine and the RM diamine.

In an embodiment of the present invention, the alignment layer composition further includes an initiator having substantially the same structure as the RM diamine, and the liquid crystal layer further includes an additional RM, of which the RM content is no more than about 0.3 wt %.

The pixel electrodes are formed on a unit pixel area of the array substrate, and the slit portions are formed in different directions on a plurality of domains defined on each of the pixel electrodes. The lower alignment and the upper alignment layer are configured so that a long axis of the liquid crystal molecules is vertically aligned when an electric field is not applied to the liquid crystal layer. Furthermore, the lower alignment layer and the upper alignment layer are configured so that the long axis of the liquid crystal molecules is arranged in an extending direction of the slit portion at each of the domains when an electric field is applied to the liquid crystal layer.

According to another aspect of the present invention, an alignment layer composition for a liquid crystal device is provided. The alignment layer composition includes a base anhydride, a base diamine, a crosslinker and a side chain component.

In an embodiment of the present invention, the base anhydride includes a base dianhydride.

The side chain component may include a vertical alignment diamine and an RM diamine. The RM diamine content may be about 10 wt % to about 80 wt % based on a total weight of the base diamine, the vertical alignment diamine and the RM diamine. The RM diamine may include a compound represented by the following chemical formula, wherein Y represents at least one selected from the group consisting of an acrylate group, a methacrylate group, a vinyl group, a vinyloxy group and an epoxy group; $X_2$ represents an alkyl group, an alkenyl group, or an alkynyl group having 1 to 18 carbon atoms and having a chain or ring structure including at least one ring or condensed ring; $A_2$ represents an alkenyl group, or alkynyl group having 1 to 18 carbon atoms and having a chain or ring structure including at least one ring or condensed ring, wherein each hydrogen atom is replaceable with a functional group; $X_1$ represents an alkyl group, an alkenyl group, an alkynyl group, which have 1 to 18 carbon atoms and have a chain or ring structure including at least one ring or condensed ring, —COO—, —OCO—, —O— or —CONH—; and $A_1$ represents an alkenyl group, an alkenyl group, or an alkynyl group having 1 to 18 carbon atoms and having a chain or ring structure including at least one ring or condensed ring, wherein each hydrogen atom is replaceable with a functional group.

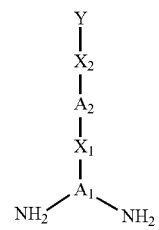

According to the present invention, the aperture ratio and the response time may be improved, and afterimages may be decreased, so that display quality may be improved. Thus, low-intensity ultraviolet light may be used for curing an RM. Therefore, organic material decomposition may be prevented, and the power consumption of a UV process may be reduced.

BRIEF DESCRIPTION OF THE DRAWINGS

The above and other features and advantages of the present invention will become more apparent by describing in detailed embodiments thereof with reference to the accompanying drawings.

FIG. 1 is a plan view illustrating an array substrate employed in a liquid crystal display (LCD) device according to one embodiment;

FIG. 3 is a flowchart illustrating a method of manufacturing an LCD device according to one embodiment;

FIG. 4 is a cross-sectional view taken along a line I-I' of an array substrate of FIG. 1;

FIG. 5 is a plan view illustrating an array substrate without the pixel electrodes of FIG. 1;

DETAILED DESCRIPTION OF THE INVENTION

Figure 2:
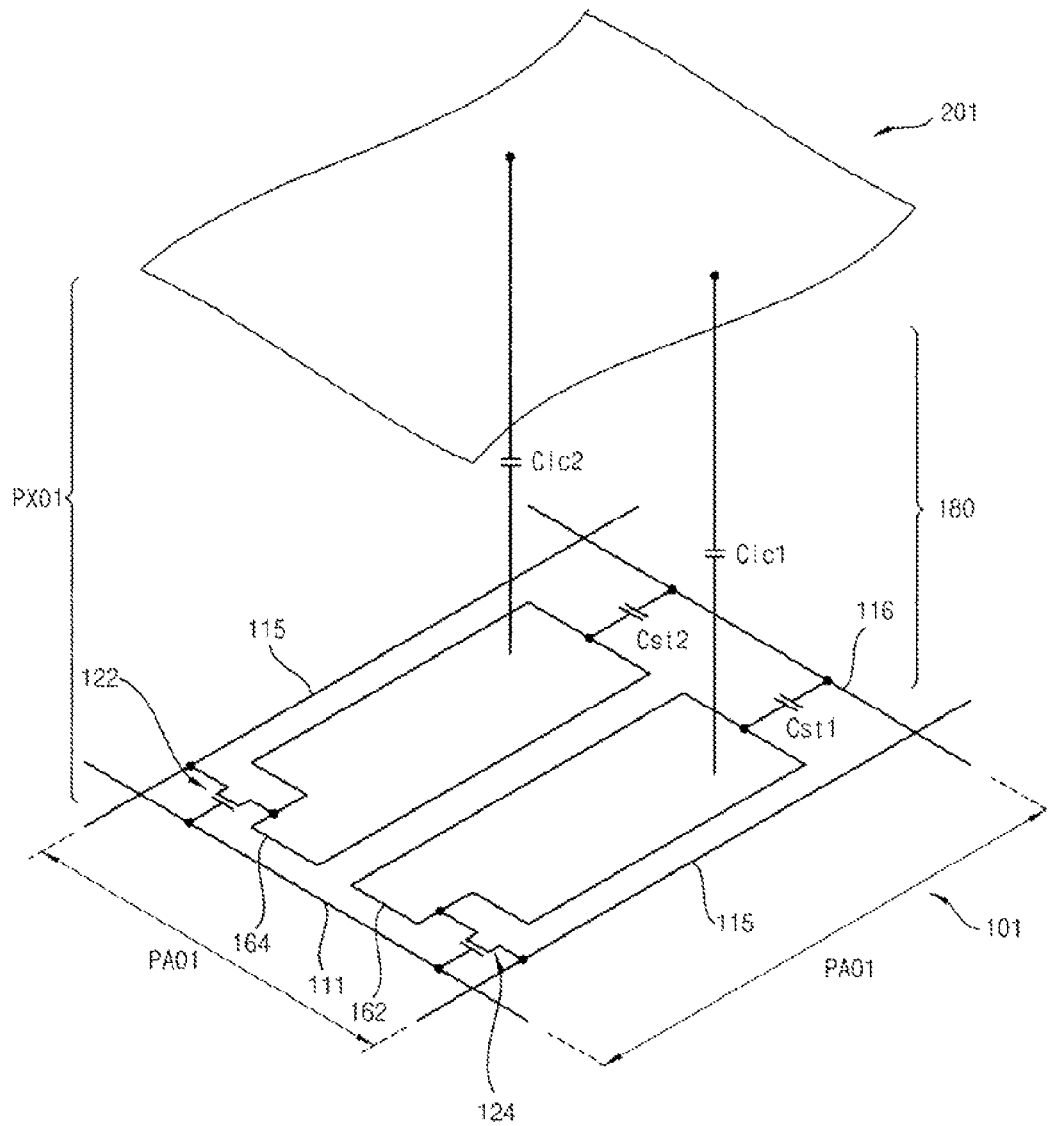
FIG. 2 is an equivalent circuit diagram illustrating one pixel PX01 in the LCD having the array substrate as illustrated in FIG. 1.

The present invention is described more fully hereinafter with reference to the accompanying drawings, in which embodiments of the present invention are shown. The present invention may, however, be embodied in many different forms and should not be construed as limited to the embodiments set forth herein. Rather, these embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. In the drawings, the same or similar elements are denoted by the same or similar reference numerals even though they are depicted in different figures. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-sectional illustrations that are schematic illustrations of idealized embodiments and intermediate structures of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms, including technical and scientific terms, used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a plan view illustrating an array substrate of a liquid crystal display (LCD) device according to one embodiment. FIG. 2 is an equivalent circuit diagram illustrating one pixel PX01 in the LCD having an array substrate 101 as illustrated in FIG. 1.

Referring to FIGS. 1 and 2, an LCD device according to one embodiment of the present invention includes the array substrate 101, an opposite substrate 201 and a liquid crystal layer 180 interposed between the array substrate 101 and the opposite substrate 201. Various technologies for enhancing display quality are employed in the LCD device. For example, a plurality of pixel electrodes 162 and 164 is disposed on a unit pixel area PA01 of the LCD device, and the pixel electrodes 162 and 164 receive pixel voltages that are different from each other. Moreover, a plurality of microslit portions 161 and 165 is formed through the pixel electrodes 162 and 164 in order to enhance the viewing angle by varying the alignment directions of the liquid crystal molecules. Moreover, an alignment layer having a reactive mesogen (RM) is formed on the pixel electrodes 162 and 164 and a common electrode of the opposite substrate 201, respectively, in order to enhance the response time of the liquid crystal. The liquid crystal is aligned to have a pretilt angle through ultraviolet (UV) curing of an RM in the alignment layer. The LCD device with improved display quality and a method of manufacturing the LCD will be described.

In the present embodiment, the array substrate 101 includes, as shown in FIGS. 1 and 2, a plurality of gate lines 111, a plurality of data lines 115, a plurality of storage lines 116, a plurality of pixel electrodes 162 and 164 and a switching part. In the present embodiment, two pixel electrodes 162 and 164 are disposed on the unit pixel area PA01. One pixel electrode in which a high pixel voltage is applied may be denoted as a main pixel electrode, and another pixel electrode in which a low pixel voltage is applied may be denoted as a sub-pixel electrode. The main pixel electrode is defined as a first pixel electrode 162, and the sub-pixel electrode is defined as a second pixel electrode 164.

The first and second pixel electrodes 162 and 164 are electrically connected to the same gate line 111, and are electrically connected to different data lines 115. That is, a pixel of the LCD device is driven through a one gate line and two data line (1G2D) method. In the present embodiment, the switching part includes a first switching element 122 and a second switching element 124. The first switching element 122 electrically connects the first pixel electrode 162 to the gate and data lines 111 and 115. The second switching element 124 electrically connects the second pixel electrode 164 to the gate line 111 and another data line 115.

The opposite substrate 201 includes a common electrode disposed to face the first and second pixel electrodes 162 and 164. The first pixel electrode 162, the common electrode and the liquid crystal layer 180 form a first liquid crystal capacitor C1c1, and the second pixel electrode, the common electrode and the liquid crystal layer 180 form a second liquid crystal capacitor C1c2. The first pixel electrode 162 and the storage line 116 form a first storage capacitor Cst1, and the second pixel electrode 164 and the storage line 116 form a second storage capacitor Cst2.

Pixel voltages having different levels may be applied to the first and second pixel electrodes 162 and 164. For example, a first pixel voltage applied to the first pixel electrode 162 can be higher than a second pixel voltage applied to the second pixel electrode 164. Alternatively, a first pixel voltage applied to the first pixel electrode 162 can be lower than a second pixel voltage applied to the second pixel electrode 164. When levels of the first and second pixel voltages are adjusted, an image viewed from a side of a display screen of the LCD device may have display characteristics close to the image viewed from the front of the display screen of the LCD device. Moreover, display quality may be substantially uniform independent of the viewing angle, so that the side visibility of the LCD device may be enhanced.

FIG. 3 is a flowchart illustrating a method of manufacturing an LCD device according to one embodiment.

A method of manufacturing the LCD device of the present embodiment is summarized in the following steps. First, an alignment layer having an RM is formed on the array substrate 101, which has a pixel electrode with microslit portions 161 and 165 formed therethrough, thereby determining an alignment direction of the liquid crystal (step S10). Then, the liquid crystal layer 180 is formed on the alignment layer (step S20). The opposite substrate 201 is then combined with the array substrate 101 (step S30). When an electric field is applied to the liquid crystal layer 180 through the first and second pixel electrodes 162 and 164, the opposite substrate 201 is irradiated by light to provide a pretilt angle to the liquid crystal by curing the RM of the alignment layer (step S40).

Hereinafter, each manufacturing process will be described in detail.

Figure 6:
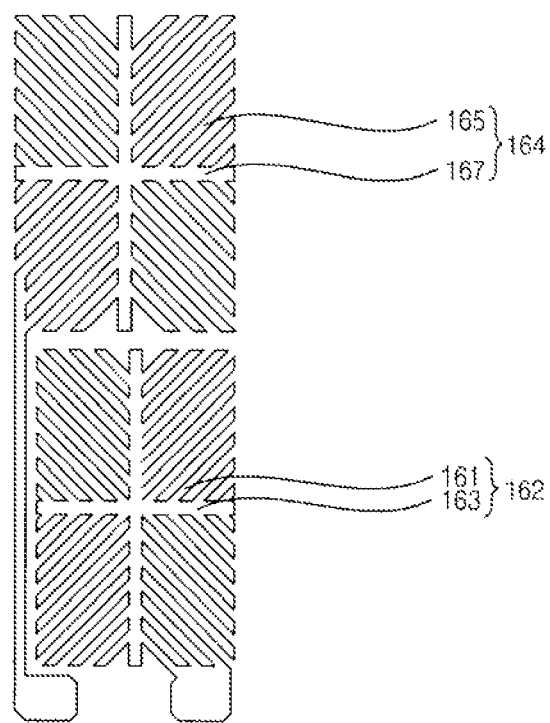
FIG. 6 is a plan view illustrating a pixel electrode of an array substrate as illustrated in FIG. 1.

FIG. 4 is a cross-sectional view taken along a line I-I' of an array substrate 101 of FIG. 1. FIG. 5 is a plan view illustrating an array substrate 101 without the pixel electrodes 162 and 164 of FIG. 1. FIG. 6 is a plan view illustrating a pixel electrode of an array substrate 101 as illustrated in FIG. 1.

Referring to FIGS. 4, 5 and 6, an alignment layer having an RM is formed on the array substrate 101 which includes the first and second pixel electrodes 162 and 164 and includes the microslit portions 161 and 165, which determine an alignment direction of the liquid crystal formed thereon (step S10).

The array substrate 101 includes a plurality of gate lines 111, a plurality of data lines 115, first and second switching elements 122 and 124 and first and second pixel electrodes 162 and 164 that are formed on a lower base substrate 110.

A gate metal is coated on a lower base substrate 110 which is composed of, for example, a glass material, and then the coated gate metal is etched to form the gate lines 111. The gate lines 111 are formed on the lower base substrate 110 to be parallel to a row direction D1. A portion of the gate line 111 forms a gate electrode 112 having a protruding shape. As shown in FIG. 4, a gate insulation layer 121 is formed on the gate lines 111.

Then, a semiconductor layer and a source metal layer are sequentially formed on the gate insulation layer 121, and then the source metal layer and the semiconductor layer are etched to form a plurality of data lines 115, a source electrode 141, a channel layer 131 and a drain electrode 143 as shown in FIG. 5. The data lines 115 are extended in a substantially column direction D2 on the gate insulation layer 121. The source electrode 141 is extended from the data line 115 at a crossing area of the gate line 111 and the data line 115, and the source electrode 141 is overlapped with a portion of the gate electrode 112. A portion of the drain electrode 143 adjacent to the source electrode 141 is disposed to overlap with the gate electrode 112, and a portion of the drain electrode 143 is extended toward the unit pixel area PA01.

The gate lines 111 and the data lines 115 cross with each other to define a substantially rectangular region, and the first and second pixel electrodes 162 and 164 are formed on the rectangular shaped region. Thus, the rectangular region may be defined as the unit pixel area PA01. Alternatively, the unit pixel area PA01 may have various shapes such as a Z-shape.

The gate electrode 112, the gate insulation layer 121, the channel layer 131, the source electrode 141 and the drain electrode 143 define the first switching element 122 which includes a three terminal element. The second switching element 124 may include a gate electrode 114, the gate insulation layer 121, the channel layer 131, a source electrode 142 and a drain electrode 144.

Then, as shown in FIG. 4, the passivation layer 151 covering the data line 115 is formed, and an organic insulation layer 153 is formed on the passivation layer 151. A contact hole exposing a portion of the drain electrode 143 is formed through the organic insulation layer 153 and the passivation layer 151.

Then, an optically transparent and electrically conductive material layer, composed of indium tin oxide (ITO), indium zinc oxide (IZO), or amorphous indium tin oxide (a-ITO), for example, is coated on the organic insulation layer 153. The optically transparent and electrically conductive material layer contacts the drain electrode 143 through the contact hole. The optically transparent and electrically conductive material layer is etched to form the first and second pixel electrodes 162 and 164 as shown in FIGS. 4 and 6. In the present embodiment, in order to enhance a viewing angle, a viewing angle enhancing technology may be used for forming the first and second pixel electrodes 162 and 164. For example, a technology dividing a pixel area into a plurality of domains having different alignment directions may be employed in the unit pixel area PA01.

In order to form the domains, the first and second pixel electrodes 162 and 164 may include a plurality of supporting electrodes 163 and 167 and a plurality of microslit portions 164 and 165. The supporting electrodes 163 and 167 may have a bar shape. The supporting electrodes 163 and 167 may be disposed to be parallel to the row direction D1 and the column direction D2 respectively, so as to form a cross shape. Each of the microslit portions 161 and 165 may be extended along a first oblique line direction D3 and a second oblique line direction D4 respectively, which are inclined with respect to the row direction D3 and the column direction D2 by an angle of about 45 degrees. Each of the microslit portions 161 and 165 may be formed to have different extended directions in each of the domains.

Here, a long axis of the liquid crystal may be arranged parallel to an extended direction of the microslit portions 161 and 165. As a result, a plurality of domains is formed to enhance a viewing angle of the LCD device. A lower polarizing plate may be attached at a rear surface of the lower base substrate 110. The microslit portions 161 and 165 formed through the first and second pixel electrodes 162 and 164 may be extended in a direction to form an angle of about 45 degrees or about 135 degrees, for example, in the first oblique line direction D3 and in the second oblique line direction D4, with respect to a lower polarizing axis of the lower polarizing plate.

Figure 7:
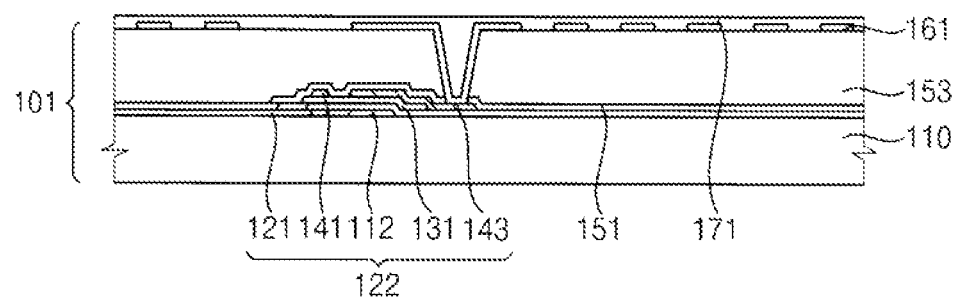
FIG. 7 is a cross-sectional view illustrating a process for forming a lower alignment layer on the array substrate of FIG. 4.

FIG. 7 is a cross-sectional view illustrating a process for forming a lower alignment layer 171 on the array substrate 101 of FIG. 4.

Figure 8:
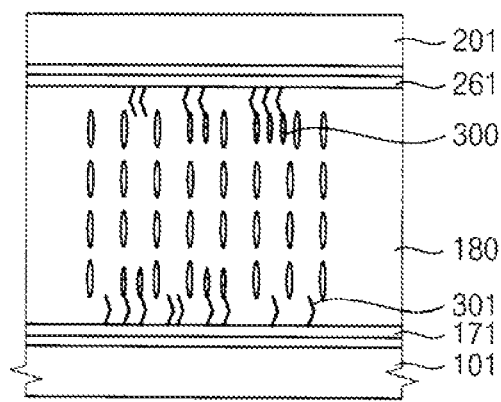
FIG. 8 is an enlarged view illustrating a vertical alignment diamine and a reactive mesogen (RM) side chain at a surface of an upper and lower alignment layer.

FIG. 8 is an enlarged view illustrating a vertical alignment portion 301 and an RM 300 at the surface of the lower and upper alignment layers 171 and 261.

Referring to FIGS. 7 and 8, a lower alignment layer 171 covering the first and second pixel electrodes 162 and 164 is formed. The lower alignment layer 171 is formed from an alignment layer composition including a base dianhydride, a base diamine, a crosslinker, and a vertical alignment diamine and, in order to introduce a vertical alignment portion, an RM diamine. The base dianhydride, the base diamine, the crosslinker, the vertical alignment diamine and the RM diamine react with each other to form a polyimide.

The vertical alignment diamine includes alkyl chain 301 as a side chain having a vertical alignment function.

An RM 300 is a side chain of the RM diamine. Therefore, the RM 300 is chemically combined with the alignment layer, and thus may not flow into the liquid crystal 180.

A mesogen is defined as a photocrosslinkable copolymer including a mesogenic group having liquid crystal properties. The anisotropy of the mesogen is induced by irradiating the mesogen with polarized UV light, and the orientation of the mesogen is then enhanced through a heat treatment. The mesogenic group is a polymer material having liquid crystal properties in a specific temperature range or in a specific solution. The RM may include a material or a compound, which is capable of inducing a liquid crystal phase reaction, and the material or compound may have a shape such as a bar, a banana, a board and/or a disk. For example, the RM may include a mesogen having a chemical group such as acrylate, methacrylate, epoxy, oxetane, vinyl-ether, styrene, and/or tyolene.

Contrary to the conventional method of enhancing the orientation of liquid crystal by a heat treatment of a liquid crystal composition including an RM, in the present invention the RM diamine having the RM is basically included in the alignment layer composition. The alkyl chain 301 of the vertical alignment diamine functions as a side chain having a vertical alignment function, and the RM 300 of the RM diamine is chemically combined with the alignment layer, and thus the RM 300 may not flow into the liquid crystal.

The RM diamine may be at least about 10 wt % to about 80 wt % of the total weight of the diamines. The RM may not function in a range below about 10 wt %, and the pretilt angle of the liquid crystal molecule may be increased when the content of the RM diamine is above about 80 wt %.

Examples of the RM diamine may include a compound represented by the following chemical formula.

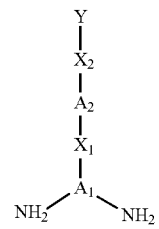

In the above chemical formula, Y represents at least one selected from the group consisting of an acrylate group, a methacrylate group, a vinyl group, a vinyloxy group and/or an epoxy group. $X_2$ represents an alkyl group, an alkenyl group, and/or an alkynyl group having 1 to 18 carbon atoms and having a chain or ring structure including at least one ring or condensed ring.

$A_2$ represents an alkenyl group, and/or alkynyl group having 1 to 18 carbon atoms and having a chain or ring structure including at least one ring or condensed ring, wherein each hydrogen atom is replaceable with a functional group. For example, $A_2$ may be represented by the following Chemical Formulas 1-6.

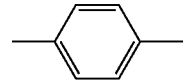

Chemical Formula 1

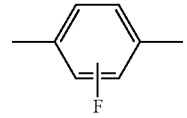

Chemical Formula 2

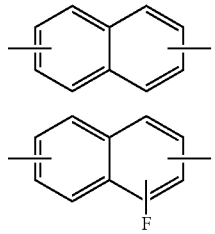

Chemical Formula 3

Chemical Formula 4

-continued

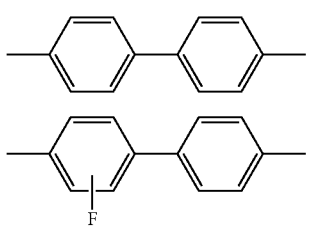

Chemical Formula 5

Chemical Formula 6

$X_1$ represents an alkyl group, an alkenyl group, and/or an alkynyl group, which have 1 to 18 carbon atoms and have a chain or ring structure including at least one ring or condensed ring, —COO—, —OCO—, —O— or —CONH—. $A_1$ represents an alkenyl group, an alkynyl group, and/or an alkynyl group having 1 to 18 carbon atoms and having a chain or ring structure including at least one ring or condensed ring, wherein each hydrogen atom is replaceable with a functional group.

For example, the RM diamine may be presented by the following chemical formula.

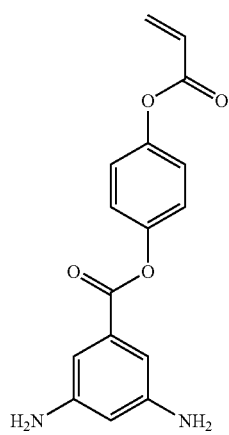 [SMILES: C=CC(=O)Oc1ccc(OC(=O)c2cc(N)cc(N)c2)cc1]

The RM combined with the alignment layer includes at least one UV polymerizable reactive group such as an acrylate group and/or a methacrylate group.

Figure 9:
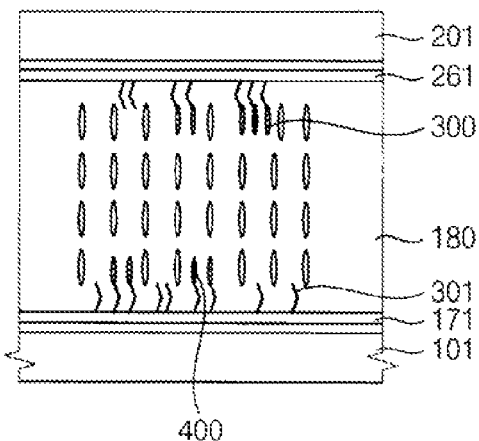
FIG. 9 is an enlarged view illustrating an initiator on a surface of the upper and lower alignment layer.

FIG. 9 is an enlarged view illustrating an initiator 400 on a surface of the upper and lower alignment layer 171.

Referring to FIG. 9, an initiator 400 having substantially the same structure as the RM diamine may be used. The initiator 400 may be used with the RM diamine, or the initiator 400 may be used separately from the RM diamine Examples of the initiator 400 may include Igacure® (Ciba Geigy Co.), which is generally used as an initiator for polymerization reactions. If the initiator absorbs a long wavelength such as 365 nm, it may be easily decomposed into a radical, and thus the initiator initiates a light polymerization reaction. In the case of using the initiator such as Igacure, long-wavelength UV light may be used, and thus a short wavelength which may cause damage to other organic materials may not be used.

Figure 10:
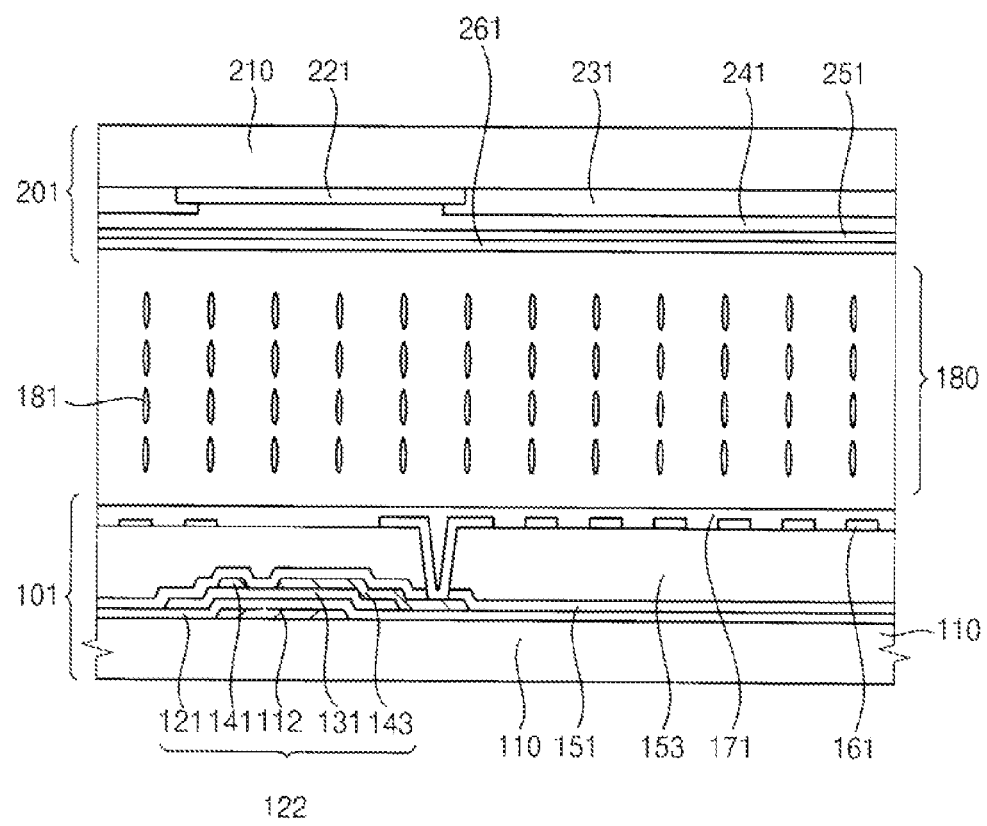
FIG. 10 is a cross-sectional view illustrating a process for combining an array substrate and an opposite substrate.

FIG. 10 is a cross-sectional view illustrating a process for combining an array substrate 101 and an opposite substrate 201 (step S30).

The opposite substrate 201 may include an upper base substrate 210, a light-blocking pattern 221, a color filter pattern 231, an overcoating layer 241, a common electrode 251 and an upper alignment layer 261.

The light-blocking pattern 221 is formed on the upper base substrate 210 in correspondence with the gate line 111, the data line 115, the first and second switching elements 122 and 124 and the storage line 116. Thus, the color filter pattern 231 is formed on the unit pixel area PA01 that does not overlap with the light-blocking pattern 221. The color filter pattern 231 may include, for example, a red color filter, a green color filter and a blue color filter. The red, green and blue color filters may be sequentially disposed in correspondence with each unit pixel area PA01 in a column direction D1.

The overcoating layer 241 covers the color filter pattern 231 and the light-blocking pattern 221, and the common electrode 251 is formed on the overcoating layer 241. The common electrode 251 may include substantially the same material as the first and second pixel electrodes 162 and 164. The common electrode 251 may be a continuous layer that does not include slit portions. When microslit portions 161 and 165 are formed through the first and second pixel electrodes 162 and 164 and when the common electrode 251 is a continuous layer that does not include slit portions, a liquid crystal cell type called a super patterned vertical alignment (S-PVA) mode is formed. Alternatively, the liquid crystal layer 180 may be driven in a patterned vertical alignment (PVA) mode. In the PVA mode, both the first and second pixel electrodes 162 and 164 and the common electrode 251 may have a plurality of slit portions for forming a fringe field.

The upper alignment layer 261 is formed on the common electrode 251. The upper alignment layer 261 may include substantially the same material as the lower alignment layer 171.

An upper polarizing plate (not shown) may be stacked on the opposite substrate 201. The polarizing axis of the upper polarizing plate may be substantially perpendicular to that of the lower polarizing plate.

Before the electric field is applied between the first and second pixel electrodes 162 and 164 and the common electrode 251, a long axis direction of liquid crystal 181 (hereinafter "director of liquid crystal") is substantially perpendicular to the array substrate 101 and the opposite substrate 201 as shown in FIG. 10.

Figure 11:
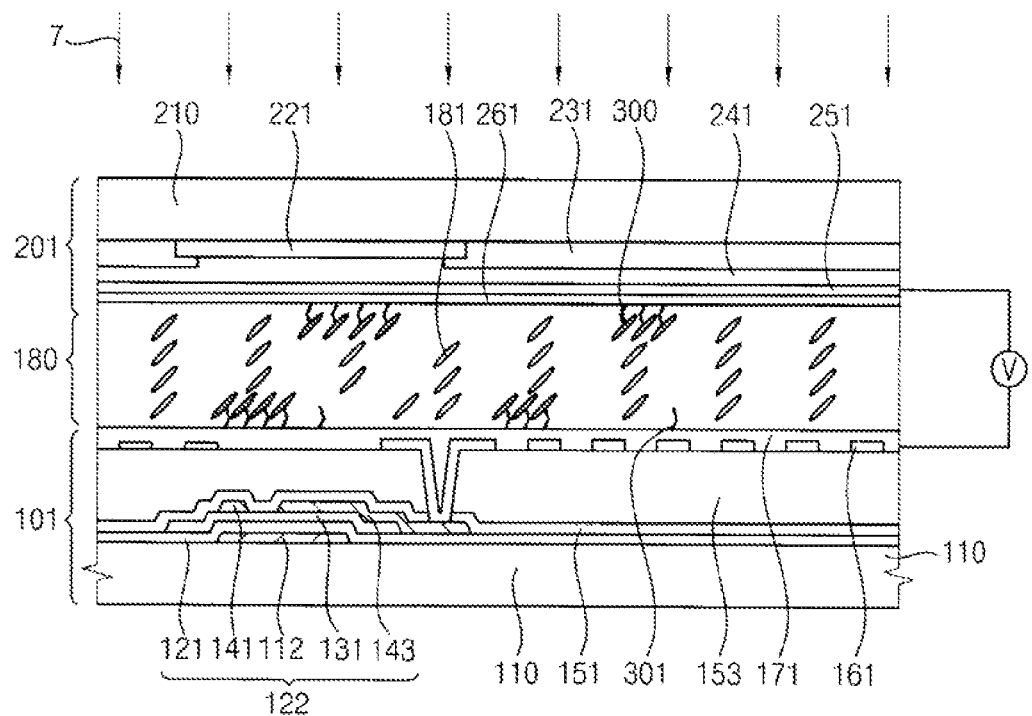
FIG. 11 is a cross-sectional view illustrating a process for providing pretilt angles of the liquid crystal molecules.
Figure 12:
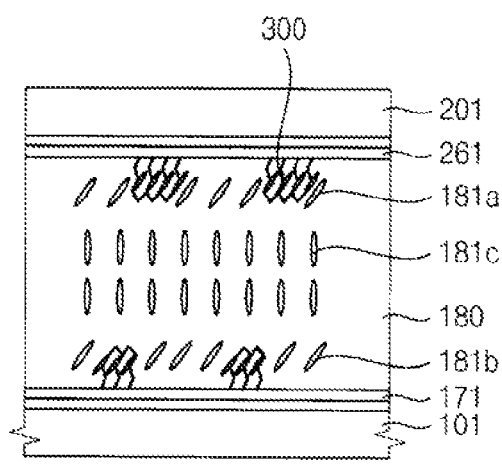
FIG. 12 is an enlarged view illustrating a process for providing pretilt angles of the liquid crystal molecules.

FIGS. 11 and 12 are cross-sectional views illustrating a process for providing pretilt angles to the liquid crystal molecules 181.

Referring to FIGS. 11 and 12, the liquid crystal layer 180 is irradiated by light through the opposite substrate 201 to provide a pretilt angle to the liquid crystal 181 adjacent to surfaces of the upper and lower alignment layers by the RM 300 (step S40).

When the pixel voltage is applied to the first and second pixel electrodes 162 and 164 and the common voltage is applied to the common electrode 251, the director of the liquid crystal 181 is tilted as shown in FIG. 11. Thus, a white driving mode may be driven. In order to fully align the director of the liquid crystal 181 to be parallel to the horizontal direction, the pixel voltage and the common voltage may be increased.

In the white driving mode, as shown in FIG. 11, the opposite substrate 201 is irradiated by UV light 7. The RM 300 is cured at surfaces of the lower and upper alignment layers 171 and 261 in response to the UV light 7 to determine the directionality of the liquid crystal 181.

Here, the liquid crystals 181a and 181b adjacent to the RM 300 may be arranged in the horizontal direction and fixed in the horizontal direction. Thus, when an electric field is not applied to the liquid crystal layer 180, liquid crystals may be arranged as shown in FIG. 12. For example, liquid crystals 181a and 181b at the surfaces of the RM 300 are aligned in a horizontal direction or have an inclined angle with respect to the surfaces of the RM 300. The liquid crystal 181c disposed farther from the RM 300 is gradually arranged perpendicular with respect to surfaces of the RM 300.

Due to the arrangement of the liquid crystal 181, the response time of the liquid crystal 181 may be improved. Moreover, arrangement directions of the liquid crystal are various, so that a viewing angle may be enhanced.

In the present embodiment, the RM 300 is not mixed with the liquid crystal composition, and the RM is combined with the lower alignment layer 171 and the upper alignment layer 261 and cured by a UV light. Thus, as described above, the RM is not mixed with the liquid crystal layer 180.

Figure 13:
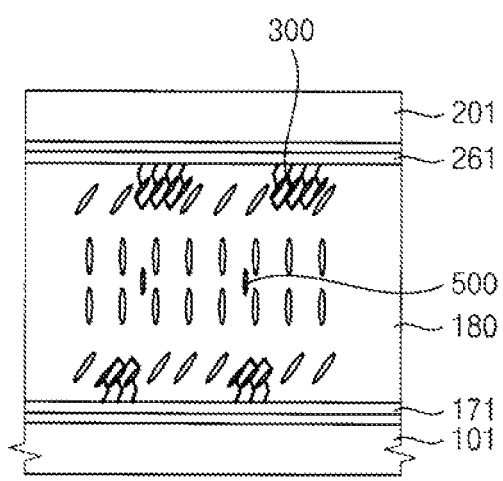
FIG. 13 is an enlarged view illustrating a display panel including an RM in the liquid crystal layer.

FIG. 13 is a cross-sectional view illustrating a display panel RM 500 in the liquid crystal layer 180.

Referring to FIG. 13, the alignment layers 171 and 261 may include RM 300. An additional RM 500 may be blended into the liquid crystal layer 180 in a range of no more than about 0.3 wt %, preferably in a range of no more than about 0.2 wt %. Thus, UV power consumption may be reduced thereby decreasing the RM in the liquid crystal.

According to an LCD device and a method of manufacturing the LCD device in accordance with an embodiment of the present invention, RM remaining in a liquid crystal layer may be decreased in an LCD device providing a pretilt angle by using an RM. Thus, afterimages due to the remaining RM in a display screen may be prevented or reduced, so that display quality may be improved. Therefore, the present invention may be applied to an LCD device using an RM.

The foregoing is illustrative of the present disclosure of invention and is not to be construed as limiting thereof. Although a few embodiments of in accordance with the present disclosure of invention have been described, those skilled in the art will readily appreciate in light of the foregoing that many modifications are possible in the embodiments without materially departing from the novel teachings and advantages of the present disclosure. Accordingly, all such modifications are intended to be included within the scope of the present disclosure. In the claims, means-plus-function clauses are intended to cover the structures described herein as performing the recited function and not only structural equivalents but also functionally equivalent structures. Therefore, it is to be understood that the foregoing is illustrative and is not to be construed as limited to the specific embodiments disclosed, and that modifications to the disclosed embodiments, as well as other embodiments, are intended to be included within the scope of the present teachings.

What is claimed is:

1. A liquid crystal display (LCD) device comprising:
 (a) an array substrate including:
 a lower substrate having a switching part formed thereon;
 a pixel electrode formed in a unit pixel area defined on the lower substrate and connected with the switching part; and
 a lower alignment layer including a polyimide and formed on the pixel electrode, the lower alignment layer including a directionally aligned reactive mesogen (RM) adapted to induce a corresponding pretilt alignment direction in adjacent liquid crystal molecules, the reactive mesogen (RM) being chemically bound to be part of the polyimide of the lower alignment layer and having a reactive functional group;
 (b) an opposite substrate including:
 an upper substrate spaced apart from and facing opposite to the lower substrate; and an upper alignment layer; and
 (c) a liquid crystal layer interposed between a surface of the lower alignment layer and a surface of the upper alignment layer, the liquid crystal layer including said liquid crystal molecules,
 wherein at least some of the liquid crystal molecules are induced by a photo-curing of a reactive functional group of the chemically bound RM to have a pretilt angle,
 wherein the polyimide is a reaction product formed from an alignment layer composition including:
 a base dianhydride,
 a base diamine, a crosslinker,
 a vertical alignment diamine and
 an RM diamine represented by

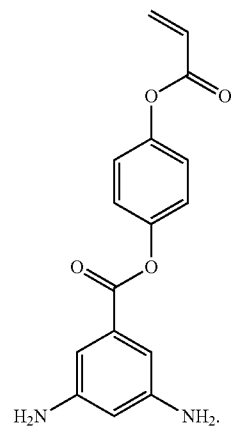

2. The LCD device of claim 1, wherein the upper alignment layer comprises an RM to induce an alignment direction of liquid crystal molecules.

3. The LCD device of claim 2, wherein
 the content of the RM diamine is about 10 wt % to about 80 wt % based on a total weight of the base diamine, the vertical alignment diamine and the RM diamine.

4. The LCD device of claim 2, wherein the pixel electrode includes a plurality of slit portions extending in different directions, and comprises a first pixel electrode and a second pixel electrode that are disposed on the unit pixel area to receive different pixel voltages, and the slit portions are formed on a plurality of domains defined on the first and second pixels.

5. The LCD device of claim 2, wherein the lower alignment layer and the upper alignment layer are configured to arrange a long axis of the liquid crystal molecules in a vertical direction when an electric field is not applied to the liquid crystal layer.

6. The LCD device of claim 4, wherein the lower alignment layer and the upper alignment layer are configured to arrange a long axis of the liquid crystal molecules in an extending direction of the slit portion at each of the domains when an electric field is applied to the liquid crystal layer.

7. The LCD device of claim 2, wherein the liquid crystal layer further comprises an additional RM, which is no more than about 0.3 wt %.

8. An alignment layer polyimide composition for an LCD device, the alignment layer polyimide composition comprising a reaction product of:
 a base anhydride;
 a base diamine;
 a crosslinker; and a reactive mesogen (RM) diamine represented by

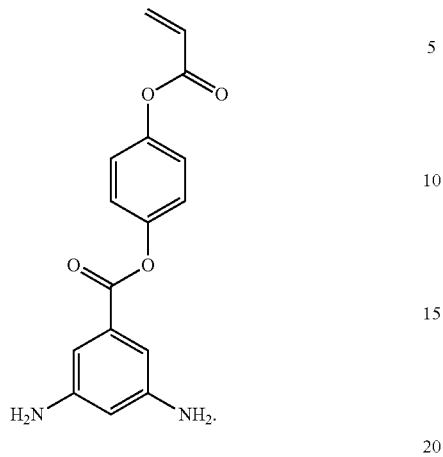

9. The alignment layer composition of claim 8, wherein the base anhydride includes a base dianhydride.

10. The alignment layer composition of claim 8, wherein the alignment layer composition further includes a vertical alignment diamine.

11. The alignment layer composition of claim 10, wherein a content of the RM diamine is about 10 wt % to about 80 wt % based on a total weight of the base diamine, the vertical alignment diamine and the RM diamine.

* * * * *